United States Patent [19]

Matsuda et al.

[11] 4,384,330
[45] May 17, 1983

[54] BRAKE CONTROL SYSTEM FOR AN AUTOMOTIVE VEHICLE

[75] Inventors: Toshiro Matsuda; Minoru Honda, both of Yokohama, Japan

[73] Assignee: Nissan Motor Company, Limited, Kanagawa, Japan

[21] Appl. No.: 195,312

[22] Filed: Oct. 8, 1980

[30] Foreign Application Priority Data

Oct. 9, 1979 [JP] Japan .................. 54-129375

[51] Int. Cl.$^3$ ............................................. B60T 8/10
[52] U.S. Cl. ...................................... 364/426; 303/97; 303/109
[58] Field of Search .................. 364/426; 303/97, 105, 303/108, 109

[56] References Cited

U.S. PATENT DOCUMENTS

| | | | |
|---|---|---|---|
| 3,709,565 | 1/1973 | Jonason et al. | 303/21 BE |
| 3,752,536 | 8/1973 | Machek | 303/21 F |
| 3,758,167 | 9/1973 | Machek | 303/40 |
| 3,827,760 | 8/1974 | Fleagle | 303/21 P |
| 3,833,268 | 9/1974 | Fleagle | 303/21 BE |
| 3,985,396 | 10/1976 | Kuwana et al. | 364/426 X |
| 4,006,942 | 2/1977 | Saito | 303/109 |
| 4,036,536 | 7/1977 | Quon | 303/97 X |
| 4,285,042 | 8/1981 | Ohmori et al. | 364/426 |

*Primary Examiner*—Jerry Smith

*Attorney, Agent, or Firm*—Lowe, King, Price & Becker

[57] ABSTRACT

Disclosed is a brake control system for an automotive vehicle for controlling application and release of brake pressure in order to prevent the vehicle from skidding. The system includes a sensing circuit for determining wheel r.p.m., a deceleration detecting circuit for determining a deceleration rate of the wheel r.p.m. and generating a signal when the determined deceleration rate becomes equal to or greater than a predetermined value, a target wheel speed circuit for determining a target wheel r.p.m. based on the wheel r.p.m. and operative responsive to detection of a peak of the coefficient of friction between the vehicle wheel and the road, and a control circuit for controlling application and release of brake fluid pressure to wheel cylinders for controlling the wheel deceleration rate. The target wheel speed circuit is operative to determine a rate of deceleration of wheel r.p.m. based on the difference in wheel r.p.m. between the time of detecting the peak coefficient of friction and the time of detecting the immediately preceding peak. The target wheel r.p.m. is further based on the length of time between detection of the peaks and is determined by subtracting a deceleration value, based on the determined rate of deceleration, from the wheel r.p.m. determined at the time of detecting of the peak of coefficient of friction.

20 Claims, 13 Drawing Figures

BRAKE CONTROL SYSTEM FOR AN AUTOMOTIVE VEHICLE

BACKGROUND OF THE INVENTION

The present invention relates generally to a brake control system for an automotive vehicle to prevent the vehicle wheels from skidding upon a rapid application of a brake force. More specifically, the invention relates to a brake control system for controlling deceleration rate of the vehicle wheel rotation relative to vehicle speed and corresponding to friction between the wheel tread and road surface.

Upon braking of a moving vehicle and the like such as automotive vehicle, a vehicle wheel is apt to be locked to cause skidding. This will necessarily create an unstable condition in the controlled motion of the vehicle. Wheel lock-up may cause such a loss in directional stability as to result in an uncontrolled skidding while at the same time the presence of locked wheels generally increases the distance required to stop. The increased stopping distance is due to a reduced coefficient of friction while skidding under most road conditions. If skidding can be prevented, the vehicle can usually be stopped more safely in a shorter distance. Therefore, various brake control systems have been developed for preventing the wheels from locking, thereby preventing the vehicle from skidding. General and typical construction of such a brake control system has been described in U.S. Pat. No. 3,897,114, entitled to "SKID CONTROL SYSTEM" to Ronald S. Scharlork. The U.S. patent discloses a brake control system for controlling the braking of a wheeled vehicle to prevent skidding. The system, which provides relief of the braking force applied to the vehicle wheel, is effectively responsive to a critical slip signal. The slip signal is generated in response to a sensed difference between a hypothetical vehicle deceleration, as approximated by a decreasing ramp signal, and the vehicle wheel speed. The comparison is made on a differential basis to provide an output signal which is utilized in controlling an output gate. The braking force is reapplied upon the sensing of a positive wheel acceleration signal and a change in the sign of the rate of change of wheel acceleration from a positive to a negative value. During this period, the skid signal is ineffective to control the brake force.

Generally, it is known that, when rapid braking is applied to a vehicle, a maximum braking effect can be obtained by providing approximately a 15% of slipping rate for the vehicle wheel with respect to the road surface, since the friction between the wheel tread and road surface is maximized at that time. Accordingly, upon rapid brake operation, it is preferable to control wheel r.p.m. relative to the vehicle speed so that it becomes about 15% lower than the vehicle speed. Namely, the brake control system operates to control the deceleration rate of the wheel r.p.m. with respect to the vehicle speed so that the wheel r.p.m. is not excessively decelerated relative to the vehicle speed. Such operation is provided to avoid locking of the wheels and resultant slipping on the road surface. In practice, when the wheel r.p.m. is decelerated to be about 15% lower than the vehicle speed, a target wheel r.p.m. is determined based on the wheel r.p.m. and a predetermined friction coefficient. Corresponding to the determined target wheel r.p.m., the deceleration rate of the wheel r.p.m. is controlled to change the actual wheel r.p.m. to approach the targe wheel r.p.m. Thus, since the deceleration rate of the vehicle depends on friction between the wheel tread and the road surface, the target wheel r.p.m. is determined based on the vehicle speed and the friction coefficient.

In actual operation, the braking fluid pressure applied to the brake device of each wheel, i.e., to each wheel cylinder, is relieved in response to deceleration of the wheel r.p.m. to a lower speed than the target wheel r.p.m. When the wheel r.p.m. recovers and exceeds the target wheel r.p.m., the braking fluid pressure is again applied to the brake device of each wheel. By repeating this operation, the vehicle can be gradually decelerated without causing locking of the wheel and therefore without causing wheel skidding on the road surface.

In the conventional system, the friction coefficient between the wheel tread and the load surface is presumed to be a constant value which is determined based on general road surface condition. However, the actual friction efficient of the wheel tread and the road surface varies depending on wheel tread wear and the road surface condition. If the actual friction coefficient is different from that of the presumed and predetermined value, the target wheel r.p.m. determined based on the predetermined friction coefficient may not correspond to the actual vehicle speed.

For situations wherein the actual friction coefficient is larger than the predetermined value, the wheel r.p.m. is rather rapidly decelerated to reach a predetermined r.p.m. after a relatively short period from braking operation. At the predetermined wheel r.p.m., the target wheel r.p.m. is determined and the brake control system becomes operative. By entering into the controlled state a relatively short period after applying the brake, the target wheel r.p.m. is determined based on a relatively high vehicle speed. Therefore, the braking distance is longer than that required. To the contrary, if the actual friction coefficient is smaller than the predetermined value, it takes a relatively long period to decelerate the wheel r.p.m. to the predetermined target value. In this result, the target wheel r.p.m. is determined significantly lower than the vehicle speed to cause possible locking of the wheel.

For effectively and satisfactorily controlling vehicle skid due to the vehicle brake system, it is required to determine the most suitable deceleration rate corresponding to friction between the wheel tread and the road surface. As stated above, the friction between the wheel tread and the road surface is maximized for a wheel deceleration rate approximately 15% lower than the vehicle speed. Therefore, by determining the peak coefficient of friction in each cycle of skid control operation and by controlling the ratio of applying and releasing the brake fluid pressure to the wheel cylinder corresponding to the detected peak of the coefficient of friction, the vehicle braking operation can be effected most effectively and satisfactorily.

SUMMARY OF THE INVENTION

Therefore, it is an object of the present invention to provide a brake control system for an automotive vehicle having a target wheel r.p.m. determining means for determining a target wheel r.p.m. of each cycle of skid control operation, which target wheel r.p.m. is variable corresponding to friction between the tire tread and the road surface.

Another and more specific object of the present invention is to provide a brake control system having a means for detecting a peak in the coefficient of friction in each skid control operation and a means for determining target wheel r.p.m., based on the wheel r.p.m. at the time of detection of the peaks of the friction in current and immediately preceding cycle of skid control operation.

To accomplish the above-mentioned and other objects of the present invention, in accordance with a preferred embodiment of the invention there is provided a brake control system having a means for determining wheel r.p.m., a means for determining a deceleration rate of the wheel r.p.m. and for generating a signal when the determined deceleration rate becomes equal to or more than a predetermined value, a means for determining a target wheel r.p.m. based on the wheel r.p.m. and being operative responsive to detection of the peak of the coefficient of friction, and a control means for controlling application and release of fluid pressure to wheel cylinders for skid controlling the wheel deceleration rate. The means for determining target wheel r.p.m. determines the rate of deceleration of wheel r.p.m. based on the difference of wheel r.p.m. between the time of detecting the peak of the friction coefficient and the time of detecting the immediately preceding peak and the length of time between detections of the peaks. The target wheel r.p.m. is then determined by subtracting a deceleration value, based on the determined rate of deceleration, from the wheel r.p.m. determined at the detection time of the peak of friction coefficient.

BRIEF DESCRIPTION OF THE DRAWINGS

The present invention will become more fully understood from a detailed description thereof provided hereinbelow, and from the accompanying drawings of the preferred embodiments of the present invention which, however, should not taken as limitative of the present invention but rather only as explanatory and illustrative thereof.

In the drawings.

DESCRIPTION OF THE PREFERRED EMBODIMENT

Figure 1:
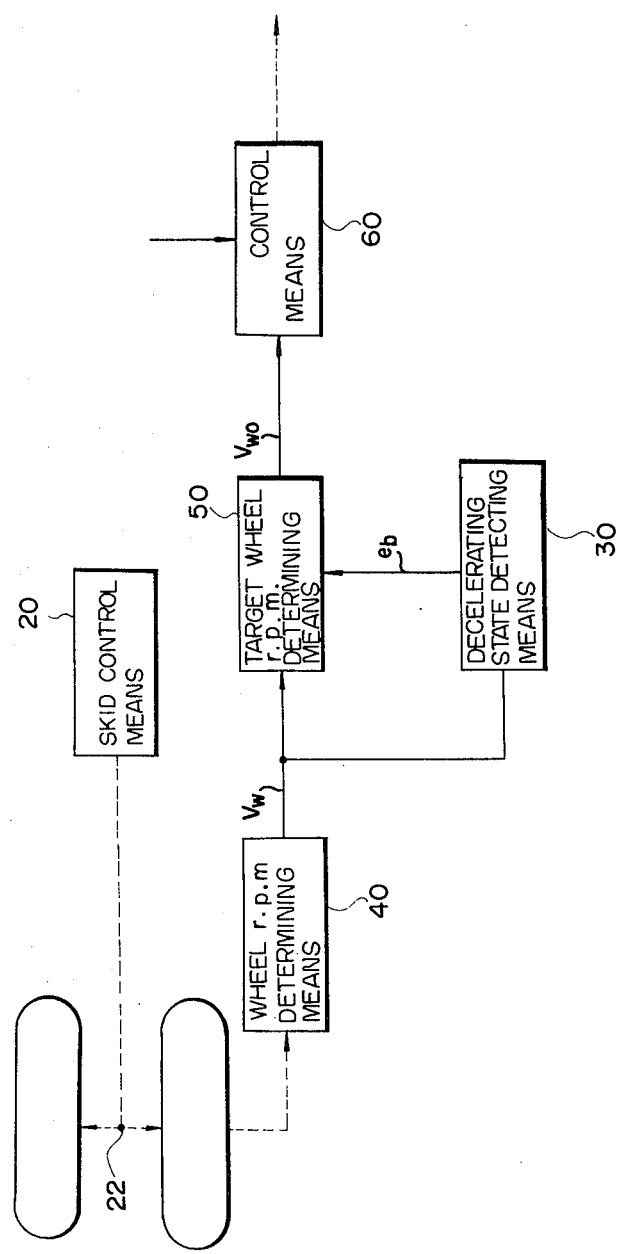
FIG. 1 is a schematic block diagram of a general circuit structure of a brake control system according to the present invention, which shows fundamental and generic concept of the present invention.

According to the present invention, the preferred embodiment of a brake control system controls application and release of a pressurized fluid to a wheel cylinder for preventing the wheel from locking and thereby for preventing the vehicle from skidding. In the brake system according to the present invention, timing for releasing the fluid pressure, and thereby for releasing the brake, is determined based on wheel r.p.m., determined by a wheel r.p.m. sensor, and a target wheel r.p.m., determined by a target wheel r.p.m. determining means. A skid control means in the brake control system generates a control signal for actuating a means for relieving fluid pressure in the wheel cylinder when the wheel r.p.m. is decelerated to be equal to or less than the target wheel r.p.m. For this purpose, the skid control means comprises a comparator circuit including a differential circuit means for comparing the wheel r.p.m. with the target wheel r.p.m. during the brake portion of the cycle and for driving an output signal when the wheel r.p.m. bears a preselected relationship to the target wheel r.p.m. In the preferred embodiment of the present invention, the target wheel r.p.m. is varied corresponding to variation in of friction coefficient between the wheel tread and the road surface. The brake control system further comprises a charge storage device which is supplied with electrical charge when a signal representing the wheel r.p.m. bears a preselected relationship to the charge on the storage device. The preselected relationship will occur when the wheel r.p.m. signal exceeds the charge on the storage device. The brake control system further includes a circuit for discharging the storage device when the wheel r.p.m. signal is less than the charge on the storage device. The discharge circuit causes the discharge of the storage device in accordance with a preselected deceleration relationship to approximate the deceleration of the vehicle. A differential creating circuit means is provided for giving greater effect to the target wheel r.p.m. as compared to the wheel r.p.m. to create a differential between the two r.p.m. values. The differential creating circuit means includes a fixed voltage drop circuit in a target wheel r.p.m. signal generating circuit and a fixed voltage drop circuit in a wheel r.p.m. signal generating circuit. The fixed voltage drop of the target wheel r.p.m. generating circuit exceeds that of the wheel r.p.m. sensor and signal generating circuit. A slip circuit includes a means for generating an output signal when the wheel r.p.m. falls a preselected magnitude below the target wheel r.p.m. to create critical slip signal. An output circuit controls the application of brake pressure. The critical slip signal provides an output signal to release brake pressure when the critical value is obtained and a slip circuit disabling means is connected in responsive to relationship to said output circuit. The disabling means operates to disable the slip circuit when the output signal is generated. The critical slip signal causes a brake relieving condition which relieves brake pressure on the vehicle wheels. The skid control means of the brake control system further includes pressure applying circuit means including first signal generating means responsive to said wheel r.p.m. for generating a rate of change of wheel acceleration signal and second circuit means for generating a wheel acceleration signal. An output gate means correlates the rate of change of acceleration signal and the wheel acceleration signal to control the reapplication of brake pressure to the wheels.

Referring now to the drawings, particularly to FIG. 1, there is illustrated a broad, fundamental construction of a preferred embodiment of a brake control system according to the present invention. As is apparent from FIG. 1, the figure briefly describes the broad structure of the brake control system according to the present invention. Some elements comprising the present system are described merely in summarized constructions and functions, since they are well known to one skilled in the art. Therefore, it will be appreciated that the portions hereinafter described in detail merely provide a characterizing part of the brake control system achieving advantages and objects sought in the present invention.

Referring now to FIG. 1, the reference numeral 20 denotes a skid control means for controlling application and release of brake pressure to a wheel cylinder of driven wheels. The skid control means 20 of the driven wheel provides control parameters for skid control operation of the driving wheels. It will be appreciated that, since the inertia of the driven wheel is substantially smaller than that of the driving wheel, the response characteristics of the deceleration of the driven wheel r.p.m. with respect to brake pressure and friction between the wheel tread and road surface is rather higher than that of the driving wheel. Therefore use of the results of a skid-control operation of a driven wheel is beneficial for controlling the skid of the driving wheel. The wheel r.p.m. of the driven shaft is determined by a wheel r.p.m. determining means 40 coupled to the wheel shaft and generating an alternating sensor signal $V_w$ having a frequency corresponding to the wheel shaft rotation speed. The sensor signal $V_w$ is differentiated by a wheel r.p.m. decelerating state detecting means 30 to obtain a deceleration rate $dV_w/dt$. The obtained deleceration ratio $dV_w/dt$ is compared with a predetermined value $V_{set}$ indicative of a desired deceleration ratio. When the determined deceleration ratio $dV_w/dt$ becomes equal to or greater than the predetermined value $V_{set}$, the detecting means 30 generates a signal $e_b$. The generated signal $e_b$ is fed to a target wheel r.p.m. determining means 50. The target wheel r.p.m. determining means 50 calculates target wheel r.p.m. based on the wheel r.p.m. signal $V_w$ and generates a target r.p.m. signal $V_{w0}$. The target r.p.m. signal $V_{w0}$ is fed to a known control means 60 for controlling the wheel cylinders.

Figure 2A:
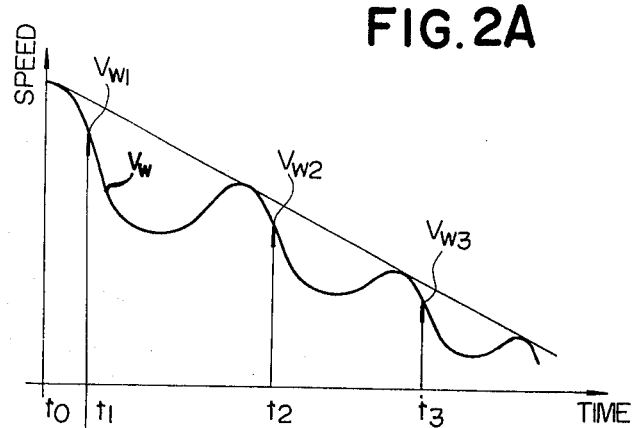
FIGS. 2a and 2b are graphs showing variation of wheel r.p.m. and vehicle speed, as decelerated and controlled by the brake control system of the present invention, and showing variation of friction coefficient between the wheel tread and the road surface.
Figure 2B:
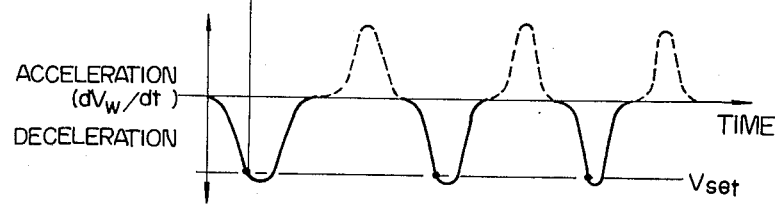

Referring to FIGS. 2A and 2B, there are illustrated graphs showing the target wheel r.p.m. determining operation effected by the means of FIG. 1. In FIG. 2, the operation is shown in the form of a graph. Assuming the brake is applied at time $t_0$, the wheel r.p.m. will be varied as shown by curve $V_w$. The determined wheel r.p.m. represented by the sensor signal $V_w$ is fed to the decelerating state detector 30. In the decelerating state detector 30, the sensor signal is differentiated to obtain the deceleration ratio $dV_w/dt$. When the determined deceleration ratio becomes equal to or more than the predetermined value $V_{set}$, the decelerating state detector 30 generates a signal $e_b$ at times $t_1, t_2, t_3 \ldots$.

It will be appreciated that generally, the peak $F_{max}$ of friction coefficient will be detected twice in one cycle of skid control, i.e. at points wherein the slipping ratio is about 15%, upon decelerating and accelerating.

Responsive to the signal $e_b$, the target wheel r.p.m. determining means 50 determines wheel r.p.m. $V_{w1}$, $V_{w2}, V_{w3}, V_{w4}, V_{w5} \ldots$ at times $t_1, t_2, t_3, t_4, t_5 \ldots$, respectively. Based on the determined wheel r.p.m., the target wheel r.p.m. determining means 50 determines target wheel r.p.m. $V_{w0}$ within a period $t_2$ to $t_3$ so that the determined target wheel r.p.m. $V_{w0}$ varies linearly with time, at an inclination given by $-D_v/d_t$ $[(-V_{w1}+V_{w2})/(t_1-t_2)]$, in the period $t_1$ to $t_2$. Likewise, the target wheel r.p.m. $V_{w0}$ in the period $t_3$ to $t_4$ is determined to be linear as a function of time with an inclination determined by variation of $V_w$ in the period $t_2$ to $t_3$. By repeating this operation the target wheel r.p.m. $V_{w0}$ is varied corresponding to inclination determined by $-D_v/D_t$ of the immediately preceding period. With respect to the target wheel r.p.m. $V_{w0}$ in this period is initially determined.

Figure 3:
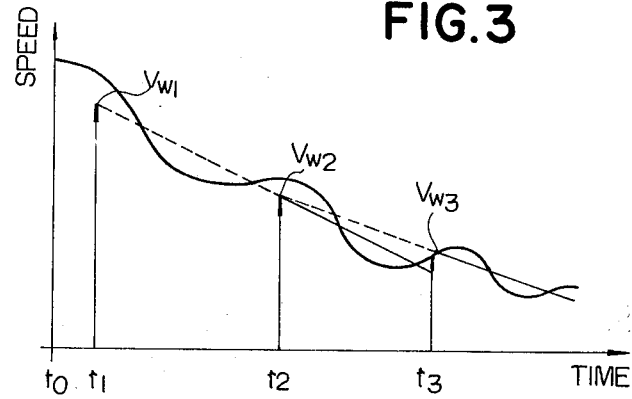
FIG. 3 is a graph showing the relationship of the wheel r.p.m. as decelerated and the target r.p.m.
Figure 4:
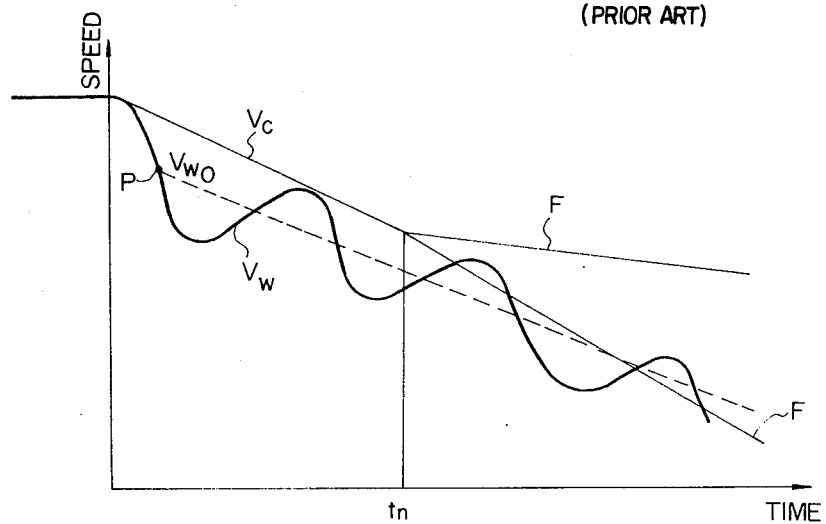
FIG. 4 is a graph showing variation of vehicle speed and wheel r.p.m., as decelerated and controlled by the conventional brake control system.

Variation of the target wheel r.p.m. $V_{w0}$ can be seen from FIG. 3. FIG. 3 is compared with FIG. 4 in which is illustrated variation of wheel r.p.m. and vehicle speed according to conventional brake control system. As seen from FIG. 4, the target wheel r.p.m. $V_{w0}$ is determined based on fixed inclination corresponding to fixed value of the friction coefficient. Therefore, in the conventional brake control system, the target wheel r.p.m. $V_{w0}$ cannot always correspond to variation of wheel r.p.m. and the vehicle speed. Contrary to this, according to the present invention, since the target wheel r.p.m. $V_{w0}$ as determined corresponds to the varying friction coefficient, the target wheel r.p.m. can satisfactorily correspond to varying of wheel r.p.m. and the vehicle speed.

Based on the determined target wheel r.p.m., either one of the driving wheel or driven wheel, or both, are skid controlled to reduce the difference between actual and target r.p.m.

Figure 5:
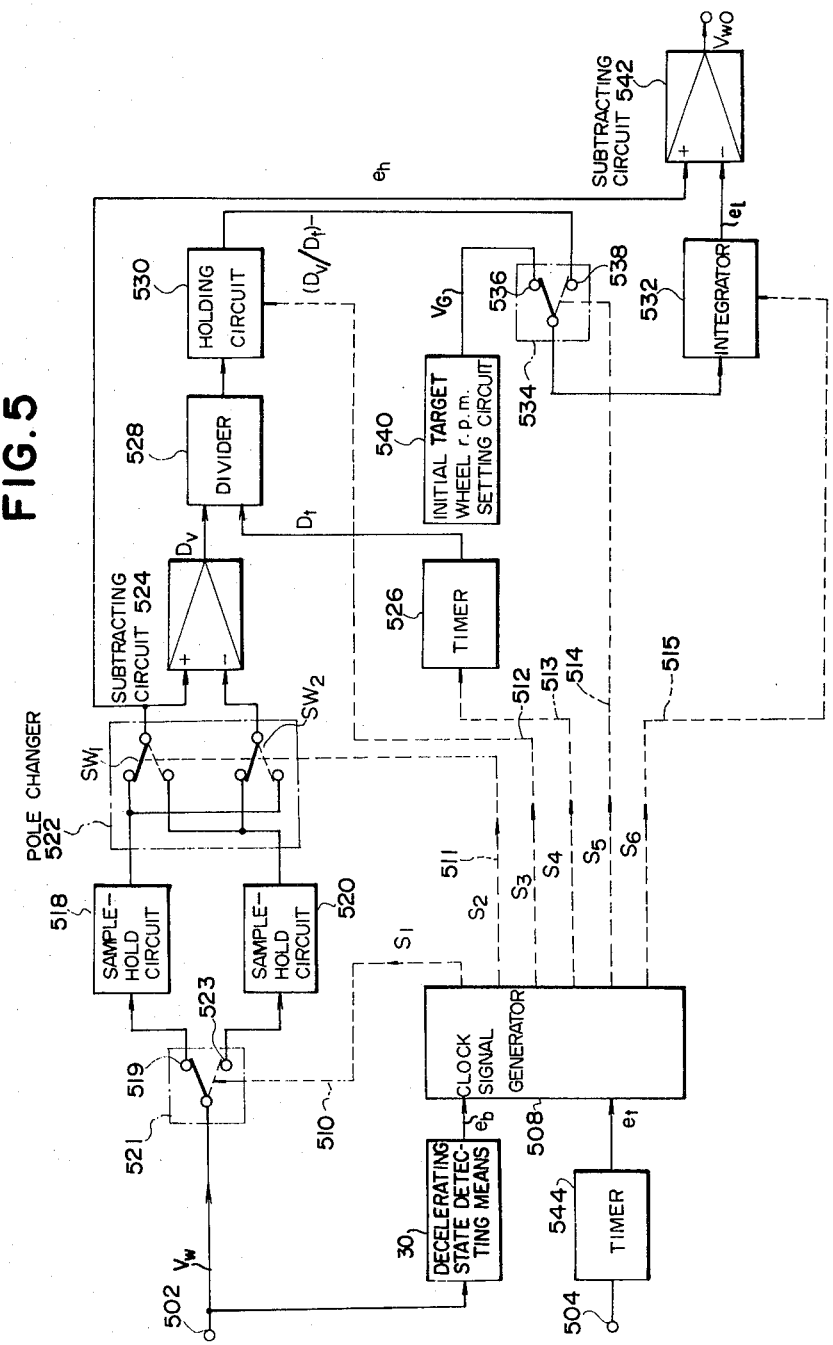
FIG. 5 is a block diagram, of a preferred embodiment of a target wheel r.p.m. determining means of the brake control system of FIG. 1.

Referring now to FIG. 5, there are illustrated details of the target wheel r.p.m. determining means 50 of FIG. 1. The structure of the circuit shown in FIG. 5 will be described hereafter with an explanation of the functions thereof with reference to the time chart of FIG. 6.

In FIG. 5, a signal $V_w$, indicative of the wheel r.p.m. determined by the wheel r.p.m. determining means 40, is input to the target wheel r.p.m. determining means 50 through an input terminal 502. As previously described, the signal $V_w$ is also input to decelerating state detector 30 which differentiates the signal value and distinguish as decelerating condition when the result of the differentiation becomes negative. The decelerating state detector 30 generates a decelerating signal $e_b$ responsive to detecting of decelerating condition. A timer signal $e_t$, which is generated in response to actuating of an actuator for releasing the brake pressure, is input through an input terminal 504. The two signals $e_b$ and $e_t$ are fed to a clock signal generator 508. The clock generator 508 generates clock signals $S_1$ to $S_6$ to be fed on leads 510 through 515, illustrated in broken lines in FIG. 5. The clock signal $S_1$ is fed to sample-hold circuits 518 and 520 which are switched between the sampling mode and the holding mode by the clock signal $S_1$. Both of the sample-hold circuits 518 and 520 are alternatively operated to hold the data indicative of wheel r.p.m. $V_w$ input from the wheel r.p.m. determining means 40. For example, in FIG. 5, the sample-hold circuit 520 is providing an output $V_{w2}$ indicative of wheel r.p.m. $V_{w2}$ corresponding to input wheel r.p.m. $V_w$. At the same time, the sample-hold circuit 518 outputs a predetermined value output $V_{w1}$ indicative of sampled wheel r.p.m. The outputs $V_{w2}$ and $V_{w1}$ are fed to a pole changer 522 including a pair of switches $S_{w1}$ and $S_{w2}$. The pole changer 522 changes polarities of inputs to a subtracting circuit 524. For example, in FIG. 5, in the shown positions of the switches $S_{w1}$ and $S_{w2}$, the subtracting circuit 524 calculates $V_{w1}-V_{w2}$. The switches $S_{w1}$ and $S_{w2}$ are turned to their alternate positions in response to clock signal $S_2$. In this switch position, the subtracting circuit 524 calculates $V_{w2}-V_{w1}$. It will be appreciated that the circuit subtracts a valve of the wheel r.p.m. $V_w$ from an immediately preceding value of wheel r.p.m. $V_w$ to obtain $D_v$.

On the other hand, the clock signal $S_4$ generated by the clock signal generator 508 is fed to a timer 526. In response to the clock signal $S_4$, the timer outputs a signal proportional to time interval $D_t$ of occurrence of the signal $e_b$. The outputs from the subtracting circuit 524 and timer 526 are input to a divider 528. The divider calculates $D_v/D_t$ to obtain the inclination or rate of change of the target wheel r.p.m. $V_{w0}$. The output indicative of $D_v/D_t$ from the divider 528 is fed to a holding circuit 530. The holding circuit 530 holds the output of the divider 528 until receiving of clock signal $S_3$ from the clock signal generator 508. The holding circuit 530 renews the held output of the divider 528 responsive to the clock signal $S_3$. The output of the holding circuit 530 is fed to an integrator 532 through a switching circuit 534. The switching circuit 534 is operative in response to clock signal $S_5$ input from the clock signal generator 508. The switching circuit 534 has two input terminals 536 and 538. The terminal 538 is connected with the holding circuit 530 and the other terminal 536 is connected with an initial target wheel r.p.m. setting circuit 540 for pre-setting an initial target wheel r.p.m. $V_{w0}$ of the first period of skid control. Therefore, either one of the outputs of the holding circuit 530 and the initial target wheel r.p.m. setting circuit 540 is input to the integrator 532. The integrator 532 generates a lamp signal $e_L$, corresponding to an input indicative of inclination $D_v/D_t$ of the target wheel r.p.m. $V_{w0}$, and feeds the lamp signals to a subtracting circuit 542. The subtracting circuits substracts the value of lamp signal $e_L$ from the signal values $V_{w1}$ or $V_{w2}$ which are selectively input to the subtracting circuit 542. Thus, the subtracting circuit 542 calculates the target wheel r.p.m. $V_{w0}$ to be fed to a skid control circuit (not shown). Based on the target wheel r.p.m. $V_{w0}$ determined as above, the skid control means controls applying and releasing of hydraulic fluid to the wheel cylinders.

Figure 6:
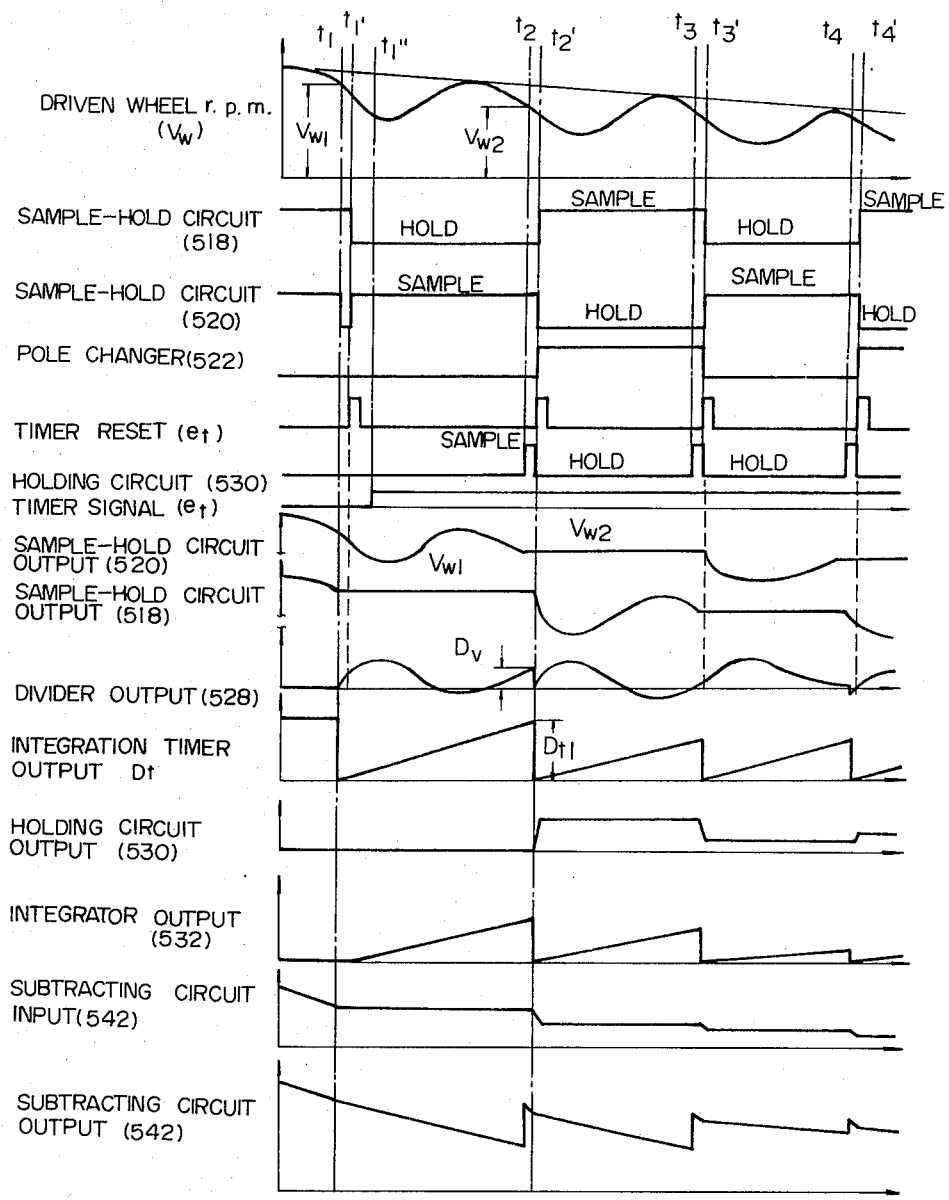
FIG. 6 is a chart of signals generated in the target wheel r.p.m. determining means of FIG. 5.

The functions of the above-described circuit are explained with reference to the time chart shown in FIG. 6.

Generally, for anti-skid controlling for the driving wheels, variation of the wheel r.p.m. of the driven wheel is measured. By measuring variation of the driven wheel r.p.m. $V_w$, the friction coefficient F between the wheel tread and the road surface is determined. The reason for this is that since the driven wheels have a smaller inertia than that of the driving wheel, the skid cycle of the driven wheel is substantially shorter than that of the driving wheel. Therefore, for controlling the driving wheel, the friction coefficient F can rapidly obtained. On the other hand, as is known, during one cycle of a skid controlling operation, the peak of the friction coefficients is detected twice.

Assuming the brake being applied at the time $t_0$, the brake control system 20 becomes operative for anti-skid controlling for the driven wheels 22. Varying of the driven wheel r.p.m. $V_w$ is determined by the wheel r.p.m. determining means 40, shown in FIG. 1. The sensor signal $V_w$ fed from the wheel r.p.m. determining means 40 is differentiated to obtain the deceleration rate $dV_w/dt$ and is compared with the predetermined value $V_{set}$. When the deceleration ratio becomes equal to or more than the predetermined value, the decelerating state detector 30 generates the signal $e_b$. Responsive to the signal $e_b$, the clock signal generator 508 generates the clock signal $S_1$. The clock signal $S_1$ is fed to the switching circuit 521 to change the switch position from terminal 519 to terminal 523. By this, the sample-hold circuit 518 samples the wheel r.p.m. $V_{w1}$, fed from the wheel r.p.m. sensor 40, immediately after generating of the signal $e_b$. Thereafter, since no input is provided to the sample-hold circuit 518, its outputs a constant output value indicative of the sampled wheel r.p.m. $V_{w1}$. On the other hand, the sample-hold circuit 520 is sequentially inputted the output of the wheel r.p.m. sensor 40, which output is indicating determined wheel r.p.m. $V_w$. The sample-hold circuit 520 outputs a corresponding output having the same value as that input thereto. At the first cycle of the skid control operation, the clock signal generator 508 will not generate the clock signals $S_2$ and $S_5$. Therefore, the pole changer 522 and switching circuit 534 are maintained in the illustrated positions. Thus, the subtracting circuit 524 outputs an output indicative of $D_v=(V_{w1}-V_w)$. The clock signal $S_4$ is generated at time $t'$ after the sample-hold circuit 518 samples the wheel r.p.m. $V_{w1}$, to make the timer 526 operative.

Thus, during the first cycle of skid control operation, the result of the divider 528 is not used for unti-skid controlling and the pre-set value of in the initial target wheel setting circuit 540 is input to the integrator 532. The integrator generates the lamp signal $e_L$ based on the input preset value for input to minus side terminal of the subtracting circuit 542. To the plus side terminal of the subtracting circuit 542 is input a sampled constant value of signal $V_{w1}$. The subtracting circuit 542 subtractively operates on both inputs to obtain the target wheel r.p.m. $V_{w0}$.

Next, assuming deceleration ratio of the wheel r.p.m. $dV_w/dt$ becomes equal to or greater than the predetermined value $V_{set}$ at time $t_2$, the clock signal generator 508 generates the clock signal $S_3$ responsive to the signal $e_b$ fed from the decelerating state detector 30. The clock signal $S_3$ is fed to the holding circuit 530. Responsive to the clock signal $S_4$, the holding circuit 530 holds inclination $(D_{v1}/D_1)$ at the time $t_1$. Further, responsive to the clock signal $S_5$, the switching circuit 534 is switched to the other position thereof. Thus the holding circuit 530 is connected to the integrator 532 through the terminal 538 of the switching circuit 534. At this time, the divider provides an output indicative of $(D_{v1}/D_{t1})=[(V_{w1}-V_{w2})/(t_1-t_2)]$. Therefore, corresponding to the divider output $(D_{v1}/D_{t1})$, the decelerating inclination of the wheel r.p.m. is set in the integrator 532. The integrator 532 generates the lamp signal $e_L$ having a constant rate ($D_{v1}/D_{t1}$) of increasing output value.

On the other hand, immediately after the time $t_1$, the clock signal generator 508 generates clock signals $S_1$ to $S_5$ at time $t_2'$. The clock signal $S_1$ is fed to the switching circuit 521 to switch the switch position from the terminal 523 to the terminal 519. Responsive to switching of the switching circuit 521, the sample-hold circuit 520 samples the wheel r.p.m. $V_{w2}$ during the term $t_2$ to $t_2'$ and outputs the constant value of signal indicative of sampled wheel r.p.m. $V_{w2}$. Alternatively, the sample-hold circuit 518 is input sequentially the wheel r.p.m. $V_w$ determined by the wheel r.p.m. sensor 40 to output the corresponding value of the output.

Meanwhile, the clock signal $S_2$ is fed to the pole changer 522 to switch the switch positions of the switches $SW_1$ and $SW_2$. By switching operation of the pole changer 522, the output of sample-hold circuit 518 is switched from the plus side to the minus side of the subtracting circuit 524 and the sample-hold circuit 520 is switched contact to the plus side terminals of the subtracting circuits 524 and 534. Therefore, the subtracting operation excuted by the subtracting circuit 522 is alternated and thus $D_v=(V_{w2}-V_{w1})$ is obtained. Moreover, the constant value $V_{w2}$ of the output of the sample-hold circuit 520 is input to the subtracting circuit 542. The subtracting circuit 542 subtracts the value $e_L$ from the input value $V_{w2}$ to obtain the target wheel r.p.m. $V_{w0}$. Further, the clock signal $S_4$ resets the timer 526 during the rising time thereof and make the timer operative again to newly measure the term from the time $t_2'$ to the next time of generating the signal $e_b$. Thus, the interval $D_t$ between the occurrence of the signal $e_b$ is determined by the timer 526.

By repeating the above-mentioned operation for determining the target wheel r.p.m. $V_{w0}$, the driving wheels are accurately and satisfactorily controlled to prevent skidding according to the varying friction coefficient between the wheel tread and the road surface.

Figure 7:
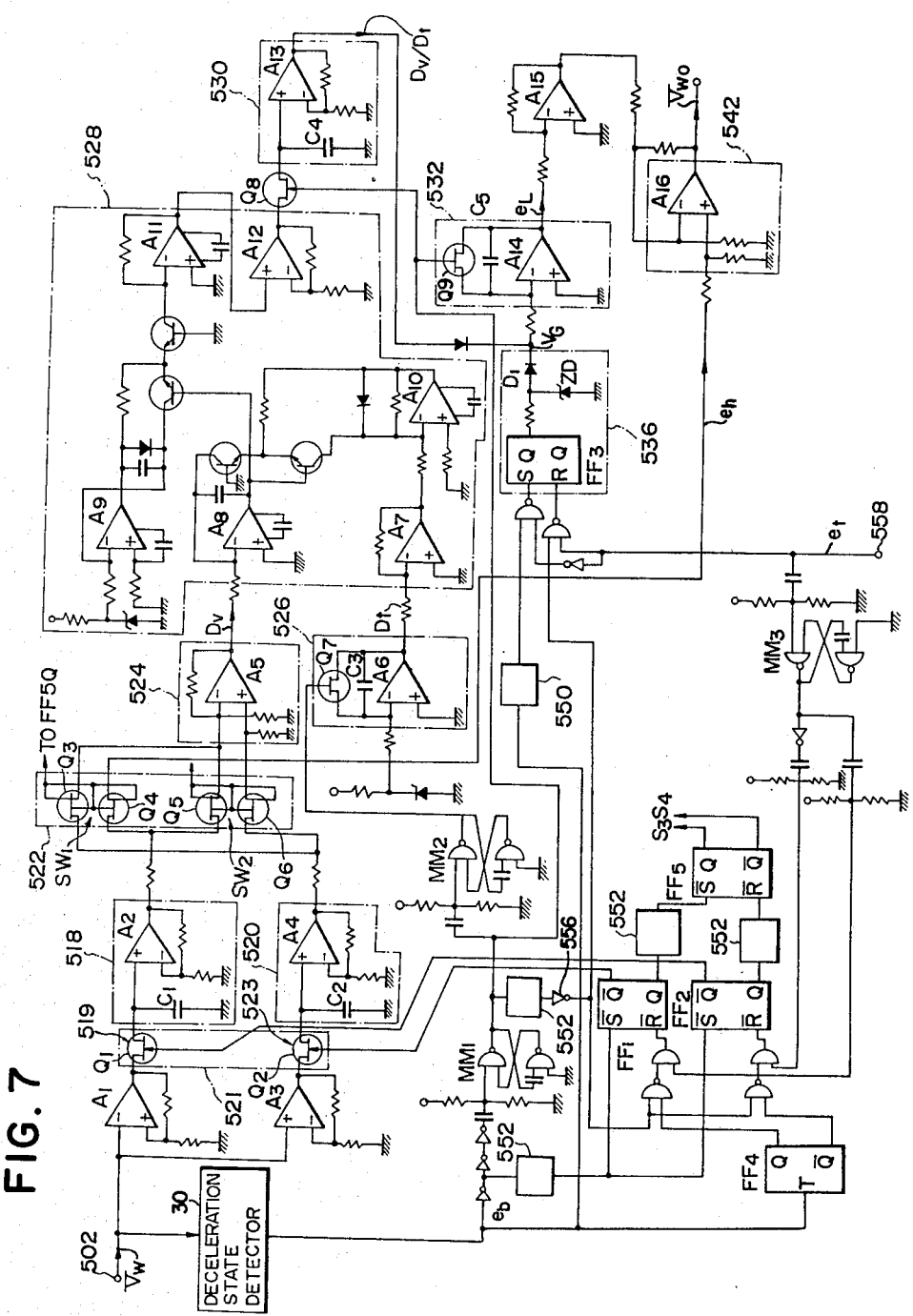
FIG. 7 is a circuit diagram of the target wheel r.p.m. determining means of FIG. 5, showing detailed circuit structure thereof.

Now, referring to FIG. 7, there is illustrated a circuit construction of the target wheel r.p.m. determining means 50 of schematically shown in FIG. 5, according to the preferred embodiment of the present invention. Hereafter, the detailed circuit construction of the target wheel r.p.m. determining means 50 will be described with reference to corresponding parts of the circuit shown in FIG. 5. The sample-hold circuit 518 is comprised of a capacitor $C_1$ and an operational amplifier $A_2$ and the sample-hold circuit 520 is comprised of the capacitor $C_2$ and the operational amplifier $A_4$. Both of the sample-hold circuits 518 and 520 are connected to the input terminal 502. The signal $V_w$ indicative of the wheel r.p.m. as determined by the wheel r.p.m. detector 40 is input to circuits 518 and 520 from input terminal 502 through analog switches 519 and 523 in use with field effect transistors $Q_1$ and $Q_2$. Here, it should be noted that the operational amplifiers $A_1$ and $A_3$ are provided as buffers of the transistors $Q_1$ and $Q_2$. The switches $SW_1$ and $SW_2$ of the pole changer 522 are respectively comprised of pairs of field effect transistors $Q_3$, $Q_4$ and $Q_5$, $Q_6$. As stated in the foregoing description with respect to FIG. 5, the pole changer 522 changes the input terminals of the subtracting circuit 524 respectively connected to the sample-hold circuits 518 and 520. The subtracting circuit 524 is constructed of a differential amplifier $A_5$. The differential amplifier $A_5$ generates an output indicative of the difference between the outputs of the sample-hold circuits 518 and 520, i.e. $D_v$.

On the other hand, time interval $D_t$ between occurrences of the signals $e_b$ is determined by an integrator circuit which acts as timer 526. The integrator circuit comprises an operational amplifier $A_6$ and capacitor $C_3$. Responsive to the signal $e_b$ fed from the decelerating state detector 30, a transistor $Q_7$ becomes operative to reset the content of the timer 526. Outputs of the operational amplifiers $A_5$ and $A_6$ are fed to the divider 528. The divider is constructed in a well known manner and comprises operational amplifiers $A_7$ to $A_{12}$. In the divider 528, the arithmetic operation is effected to obtain the inclination ($dv/Dt$) of deceleration of wheel r.p.m. The operational amplifier $A_{12}$ outputs an output indicative of the determined inclination ($Dv/Dt$) to the holding circuit 530 through an analog switch in use with a transistor $Q_8$. The holding circuit comprises an operational amplifier $A_{13}$ and a capacitor $C_4$. The holding circuit 530 outputs constant value of signal indicative of determined inclination. At this time, the switching transistor $Q_8$ is switched between on and off conditions in response to the clock signal $S_3$.

At the first cycle of skid control operation, from initially applying the brake pedal and generating the second signal $e_b$, a flip-flop $FF_3$ is maintained in a set position. Accordingly, a Zener diode ZD outputs a signal $V_G$ having a constant value indicative of preset initial decelerating inclination. Integrator 532 is comprised of an operational amplifier $A_{14}$ and a capacitor $C_5$. The integrator 532 generates the lamp signal $e_L$ corresponding to an input provided from either the Zener diode ZD or the holding circuit 530. The subtracting circuit 542 comprises an operational amplifier $A_{16}$ for subtracting the value of the lamp signal $e_L$ from the input selectively inputted form either one of sample-hold circuit 518 of 520 indicative of the sampled wheel r.p.m. As the result of the subtracting operation, the subtracting circuit 542 outputs a signal indicative of the target wheel r.p.m. $V_{w0}$.

In the above-described circuit of the target wheel r.p.m. determining means, the transistors $Q_1$ to $Q_8$ are turned on and off by clock signals $S_1$ to $S_4$. The clock signal generating circuit 508 comprises flip-flops $FF_1$, $FF_2$, $FF_4$ and $FF_5$, monostable multivibrators $MM_1$, $MM_2$ and $MM_3$, rising time differentiation circuit 550 and rising down time differentiation circuit 552.

Figure 8:
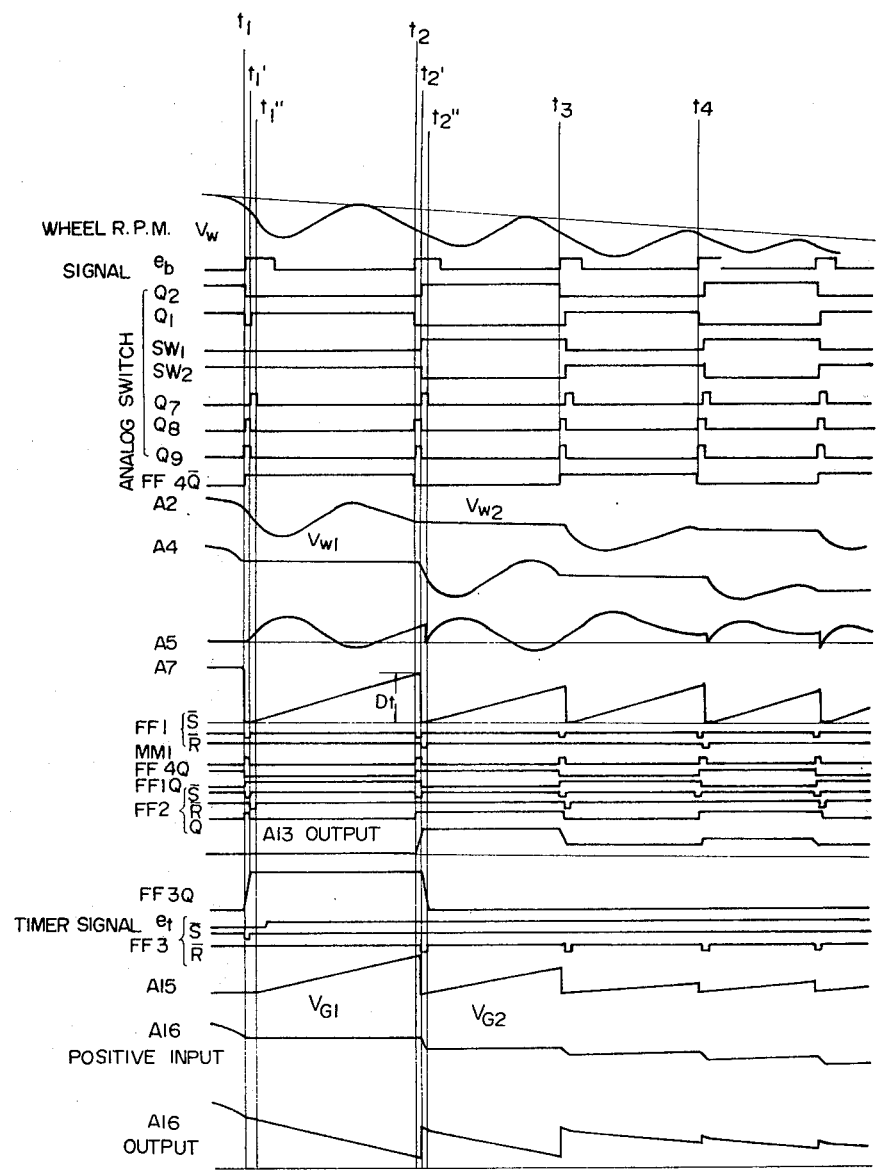
FIG. 8 is a chart of signals generated in the target wheel r.p.m. determining means of FIG. 7, which is illustrated corresponding to the chart of FIG. 6.

The function of the above-mentioned circuit of the target wheel r.p.m. determining means 50 will be described with reference to FIG. 8 in which are shown time charts of operation of each circuit of the target wheel r.p.m. determining means 50 of FIG. 7, which time chart is illustrated corresponding to FIG. 6. Now, assuming that the brake is rapidly applied at time $t_0$, the wheel r.p.m. is rapidly decelerated and the deceleration ratio $dV_w/dt$ becomes equal to or greater than the predetermined value $V_{set}$ at a time $t_1$. Responsive to this, the decelerating state detector 30 generates the signal $e_b$. The signal $e_b$ is input to the clock signal generator 508. At this time, the signal $e_t$, generated responsive to actuating of the actuator which controls the application and release of brake pressure, is input to the clock signal generator 508 through the input terminal 504. Responsive to rising of the signal $e_b$, the flip-flop $FF_1$ becomes set, i.e. (Q=High level Q̄=Low level) through the differentiation circuit 552. At this moment, the wheel r.p.m. $V_{w1}$ at the time $t_1$ is held in the capacitor $c_2$ and the output of the operational amplifier $A_4$ becomes constant with slight delay from the time $t_1$, the output of the monostable multivibrator $MM_1$ turns to a high level. The output of the monostable multivibrator $MM_1$ is fed to the flip-flop $FF_1$ through the differentiation circuit 552 and inverter 556. The flip-flop $FF_2$ is set responsive to the signal $e_b$ and is reset responsive to the output of the monostable multivibrator $MM_1$. Thus, the flip-flop $FF_2$ is reset to a state with $\overline{Q}$ at a high level and Q at a low level. At this condition of the flip-flop $FF_2$, the analog switch $Q_1$ turns on. The operational amplifier outputs an output indicative of input wheel r.p.m. $V_w$ responsive to turning on of the analog switch $Q_1$.

At the first time of generating the signal $e_b$ at time $t_1$, since the output values of the operational amplifiers $A_2$ and $A_4$ are equal to one another, the differential output of the operational amplifier $A_5$ becomes zero. Also, the output of the operational amplifier $A_{13}$ as the divider 528 is zero. Therefore, in the first cycle of skid control operation, the initially pre-set target wheel r.p.m. $V_{w0}$ of the initial target wheel r.p.m. setting circuit 540 is used.

In anti-skid, control operation, an electromagnetic actuator such as a solenoid becomes operative with delay from the time $t_1$ for releasing the wheel cylinder and draining the pressurized fluid. In synchronism with release of the wheel cylinder, a clock signal $e_t$ is input to the target wheel r.p.m. determining means 50 through an input terminal 504. At the time $t_1$, since the signal value of the clock signal $e_t$ is at a low level, the flip-flop $FF_3$ is placed in a set condition by the signal $e_b$. In this state, the output terminal Q of the flip-flop $FF_3$ is at a high level potential. Responsive to this, the diode $D_1$ attains an position to input the output of constant value of the Zener diode ZD to the operational amplifier $A_{14}$. Therefore, the capacitor $C_5$ is charged with a voltage increasing to voltage $V_G$ and thereby outputs lamp signal $e_L$. The lamp signal $e_L$ is inverted by the operational amplifier $A_{15}$ and is then input to the operational amplifier $A_{16}$ operating as subtracting circuit 542. On the other hand, a signal $V_{G1}$ of constant value and indicating the sampled wheel r.p.m. $V_{w1}$ is input to the operational amplifier $A_{16}$ through the analog switch $Q_3$. Thus, by subtracting the value of the lamp signal $e_L$ from the value of the signal $V_1$, the target wheel r.p.m. $V_{w0}$ is obtained.

When the output of the monostable multivibrator $MM_1$ attains a low level at the time $t_1'$, the monostable multivibrator $MM_2$ reaches a high level to turn on the analog switch $Q_5$. Responsive to turning on of the analog switch $Q_5$, the capacitor $C_3$ discharges the change stored therein to have no potential therein. The monostable multivibrator $MM_2$ turns to the low level at the time $t''$. At this moment, the analog switch $Q_5$ turns off and the capacitor $C_3$ starts charging the potential therein. Namely, the capacitor $C_3$ attains a potential proportional to the length of period Dt from the time $t_1'$ to next time of inputting the signal $e_b$. The signal proportional to the length of the period Dt is generated by the operational amplifier $A_6$ and is fed to the capacitor $C_3$.

Assuming the next signal $e_b$ is detected at the time $t_2$, the signal $e_b$ operates the target wheel r.p.m. determining means 50 in the same way as discussed above. The signal $e_b$ inversally sets the flip-flop $FF_4$. At this time, the flip-flop $FF_1$ is maintained in the set condition and the flip-flop $FF_2$ is inversely set. Thus, the analog switch $Q_1$ is turned off to retain the wheel r.p.m. voltage $V_{w2}$ in the capacitor $C_1$. Therefore, the operational amplifier $A_2$ outputs constant value of output indicative of the sampled wheel r.p.m. $VW_2$. Since the flip-flop $FF_5$ is in the reset state and therefore the analog switch $S_{w1}$ is off and the analog switch $SW_2$ is on during the first cycle of skid control operation, the operational amplifier $A_4$ is connected to the plus side input terminal of the operational amplifier $A_5$ and the operational amplifier $A_2$ is connected with the minus side input terminal of the operational amplifier $A_5$. Therefore, the output of the operational amplifier $A_2$ indicative of the wheel v.p.m. $V_{w2}$ is input to the minus side and output of the operational amplifier $A_4$ is input to the plus side of the operational amplifier $A_5$. The operational amplifier $A_5$ obtains the difference Dv ($=V_{w1}-V_{w2}$) from both inputs.

At the same time, the operational amplifier $A_6$ outputs an output indicative of the interval of period $Dt_1$ between the times $t_1$ and $t_2$ through the operational amplifier $A_7$. Both outputs of the operational amplifiers $A_5$ and $A_6$ are fed to the divider 528. The divider 528 calculates both inputs to determine the inclination ($Dv_1/Dt_1$) of deceleration of the wheel r.p.m. and to provide an output proportional to the determined inclination. The output of the divider 528 is outputted from the operational amplifier $A_{12}$ to the holding circuit 530. During the period from $t_2$ to $t_2''$, the monostable multivibrator $MM_1$ becomes high to turn on the analog switch $Q_8$. Thus, the capacitor $C_4$ holds the outputs of the operational amplifier $A_{12}$. At the time $t_2'$, the analog switch $Q_8$ turns off responsive to lowering of output level of the monostable multivibrator $MM_1$. Thus, the content of the capacitor $C_4$ is output through the operational amplifier $A_{13}$ as a constant value.

On the other hand, since the output of the timer 526 is high, the flip-flop $FF_3$ is reset by the signal $e_b$ at the time $t_2$ and the diode $D_1$ becomes inoperative. Therefore, the output of the Zener diode ZD is not fed to the operational amplifier $A_{14}$ to which, instead, is provided the output of the operational amplifier $A_{13}$ indicative of the determined inclination ($D_{v1}/D_{t1}$). Likewise to analog switch $Q_8$, the analog switch $Q_9$ is kept in on this, the capacitor $C_5$ discharges the content to drop the potential thereof to zero.

At the time $t_2'$, the output of the monostable multivibrator $MM_1$ becomes low. Since the flip-flop $FF_4$ is in the set state, the flip-flop $FF_1$ is reset. Responsive to this, the analog switch $Q_2$ turns on. Therefore, the operational amplifier $A_4$ provides an output having a value corresponding to the input indicative of wheel r.p.m. $V_w$. Here, the reset terminal $\overline{R}$ of the flip-flop $FF_2$ is maintained at a low level potential by the input fed from the output terminal Q of the flip-flop $FF_4$. Thereby, the analog switch $Q_1$ is maintained off position. Thus, the operational amplifier $A_2$ provides a constant value of output indicative of sampled wheel r.p.m. $V_{w2}$.

The flip-flop $FF_5$ is set in response to turning of the flip-flop $FF_2$. By this, the analog switch $SW_1$ becomes on and the analog switch $SW_2$ becomes off. Therefore, the operational amplifier $A_2$ is connected with the plus side of the operational amplifier $A_5$ and the operational amplifier $A_4$ is connected with the minus side.

Further, responsive to the high output level of the monostable multivibrator $MM_2$ during the period $t_2''$, the analog switch $Q_7$ turns on to discharge capacitor $C_3$. Thereafter, the capacitor $C_3$ starts measuring the duration of the second cycle of skid control operation.

After the above-mentioned operation, the operational amplifier $A_{14}$ outputs the lamp signal having a value corresponding to the output of the operational amplifier $A_{13}$, at the time $t_2''$. The output of the operational amplifier $A_{14}$ is inverted through the operational amplifier $A_{15}$ and is input to the minus side input terminal of the operational amplifier $A_{16}$. At the same time, the output $V_{G2}$ of the operational amplifier $A_4$ has a constant value indicative of the sampled wheel r.p.m. $V_{w2}$ and is fed to the plus side input terminal of the operational amplifier $A_{16}$. Based on both inputs $V_{G2}$ and $e_L$, the operational amplifier $A_{16}$ determines the target wheel r.p.m. $V_{w0}$ and outputs a signal indicative of the determined target wheel r.p.m.

From the third cycle of the skid control operation, the target wheel r.p.m. determining means 50 repeats the same functions explained above with respect to the second cycle of the skid control operation. During repeating of cycles of skid control operation, the analog switches $Q_1$ and $Q_2$ are alternatively and repeatedly turned on an off by functioning of the flip-flops $FF_1$ and $FF_2$. Likewise, the analog switches $SW_1$ and $SW_2$ are alternatively operated by the flip-flop $FF_5$.

When the anti-skid control operation is completed, the timer output $e_t$ drops to a low level. Responsive to this, the output of the monostable multivibrator $MM_3$ raises to a high level. The flip-flop $FF_2$ is reset during rising of the output of the monostable multivibrator $MM_3$ and the flip-flop $FF_1$ is reset during dropping of the same. As a result, the flip-flop $FF_5$ is reset. Thus, the target wheel r.p.m. determining means 50 becomes inoperative.

Figure 9:
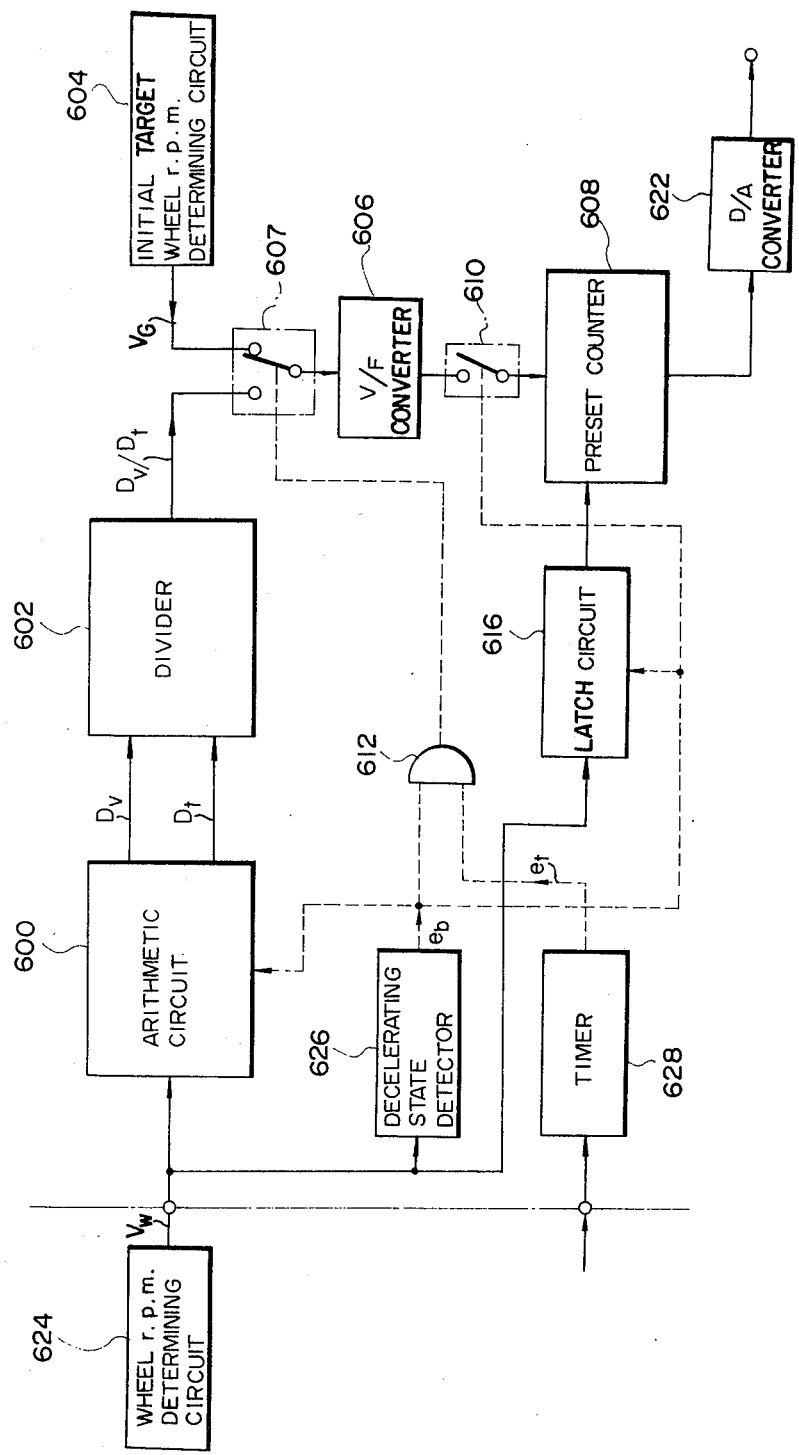
FIG. 9 is a block diagram of another embodiment of the target wheel r.p.m. determining means according to the present invention.

Referring now to FIG. 9, there is illustrated another embodiment of the target wheel r.p.m. determining means 50 according to the present invention. In the embodiment described hereinafter, the target wheel r.p.m. is determined a digital operation.

In FIG. 9, the reference numeral 600 denotes an arithmetic circuit for determining the difference $D_v$ of the wheel r.p.m. during intervals between occurrences of the signals $e_b$ generated by a decelerating state detector 626 when the deceleration rate becomes equal to or greater than the predetermined value $V_{set}$, and for determining the length of the period $D_t$. To the arithmetic circuit 600 there is input a sensor signal indicative of wheel r.p.m. from the wheel r.p.m. determining circuit 624. The outputs of the arithmetic circuit 600 indicative of the determined $D_t$ and $D_v$ are input to a divider 602. The divider 602 has substantially the same circuits as shown in FIG. 7. The reference numeral 604 denotes an initial decelerating inclination setting circuit for generating a signal $V_G$ having a potential corresponding to a predetermined signal wheel r.p.m. The initial decelerating inclination setting circuit 604 is operable during the first cycle of skid control operation. Either one of the outputs of the divider 602 and the initial target wheel r.p.m. setting circuit 604 is fed to a V/F converter 606 through a switching circuit 607. The V/F converter 606 generates a pulse signal having a frequency corresponding to the value of its input. The pulse signal generated by the V/F converter 606 is fed to a preset counter 608 through a switching circuit 607. The switching circuit 610 is connected with an AND gate 612. A timer signal $e_t$ generated by a timer 628 in response to the actuator signal is input to the AND gate 612. The AND gate 612 performs a logical multiplication of the signal $e_b$ and the timer signal $e_t$ and generates a signal corresponding to the determined logical multiplication.

On the other hand, the input indicative of the wheel r.p.m. $V_w$ determined by the wheel r.p.m. sensor 624 is fed to a latch circuit 616. Further, the signal $e_b$ is also inputted to the latch circuit 616. The latch circuit latches the wheel r.p.m. $V_w$ in response to the $e_b$ signals and outputs an output corresponding to the latched value. The pulse signal output of the latch circuit 616 is fed to the preset counter 608, which counts down the value of that output. The output of the preset counter 608 is fed to a D/A converter to be converted into an analog signal indicative of the target wheel r.p.m.

The function of the above-explained circuit will be explained hereafter. When rapid braking is applied and the decelerating ratio determined by the deceleration state detector 626 becomes equal to or greater than the predetermined value, the decelerating state detector generates a signal $e_b$. Responsive to the signal $e_b$, the latch circuit 616 becomes operative to latch the value of the signal $V_w$, indicative of the wheel r.p.m. determined by the wheel r.p.m. sensor 624. At this time, since the difference of the wheel r.p.m. is zero and therefore the output of the arithmetic circuit 600 is zero, the output of the divider 602 is also zero. Meanwhile, responsive to the output of the AND gate 612, the switching circuit 607 is turned to connect the initial target wheel r.p.m. setting circuit 604 to the V/F converter 606. Therefore, the V/F converter 606 generates a pulse signal corresponding to the preset initial decelerating inclination.

At the same time, the signal $e_b$ is fed to the switching circuit 610 to turn on the same. Also, the constant output of the latch circuit 616 is fed to the preset counter 608 and preset therein. The preset value in the preset counter 608 is counted down by a pulse signal fed from the V/F counter 606.

Thus, preset counter 608 generates a pulse signal having frequency corresponding to the target wheel r.p.m. $V_{w0}$. The pulse signal is converted to the analog signal indicative of the target wheel r.p.m. $V_{w0}$.

In response to detection of the second signal $e_b$, the actuator signal is input to the target wheel r.p.m. determining means 50. Responsive to the actuator signal the timer 628 generates the timer signal $e_t$. The AND gate 612 provides an output to turn the switching circuit 607 to connect the divider 602 to the V/F converter 606 in response to timer signal $e_t$. At this time, the arithmetic circuit 600 effects an arithmetic operation to obtain the difference of wheel r.p.m. $D_{v1}$ ($=V_{w1}-V_{w2}$) and the period $D_t$ of first skid control operation. The divider 602 thus obtains $D_{v1}/D_{t1}$ and generates an output proportional to the determined value of decelerating inclination ($D_{v1}/D_{t1}$). During the above-mentioned operation, the content of the preset counter 608 is cleared and preset to the wheel r.p.m. $V_{w2}$ at the time of detecting the second signal $e_b$, which wheel r.p.m. $V_{w2}$ is latched in the latch circuit 616 and output therefrom as a constant value.

The output of the divider 602 is converted to a pulse signal having a frequency corresponding to determined inclination ($D_{v1}/D_{t1}$) through the V/F converter 606. Based on the preset wheel r.p.m. $V_{w2}$ and the pulse signal fed from the V/F converter 606, the preset counter 608 generates a pulse signal corresponding to the target wheel r.p.m. $V_{w0}$. The pulse signal of the preset counter 608 is converted to an analog signal having a potential corresponding to the determined target wheel r.p.m. $V_{w0}$.

From the third skid control operation each circuit of the target wheel r.p.m. determining means repeats the same function as the above-explained second skid control operation.

Figure 10:
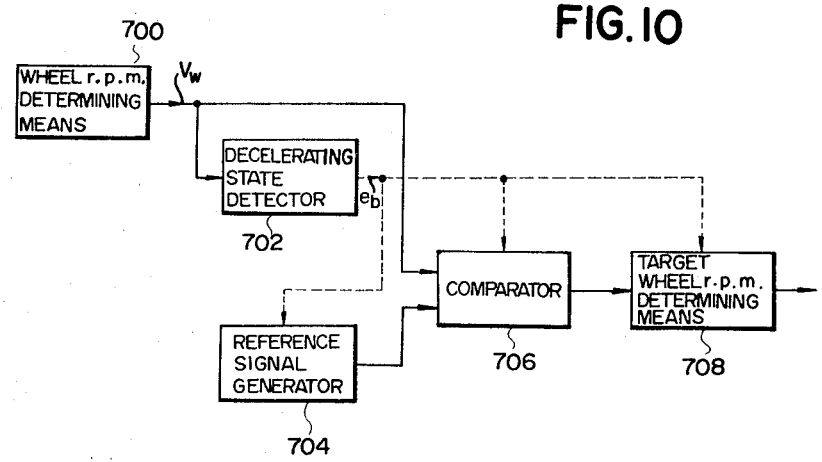
FIG. 10 is a schematic block diagram of still another embodiment of a brake control system according to the present invention, in which the system of FIG. 1 is modified to simplify the construction thereof.
Figure 11:
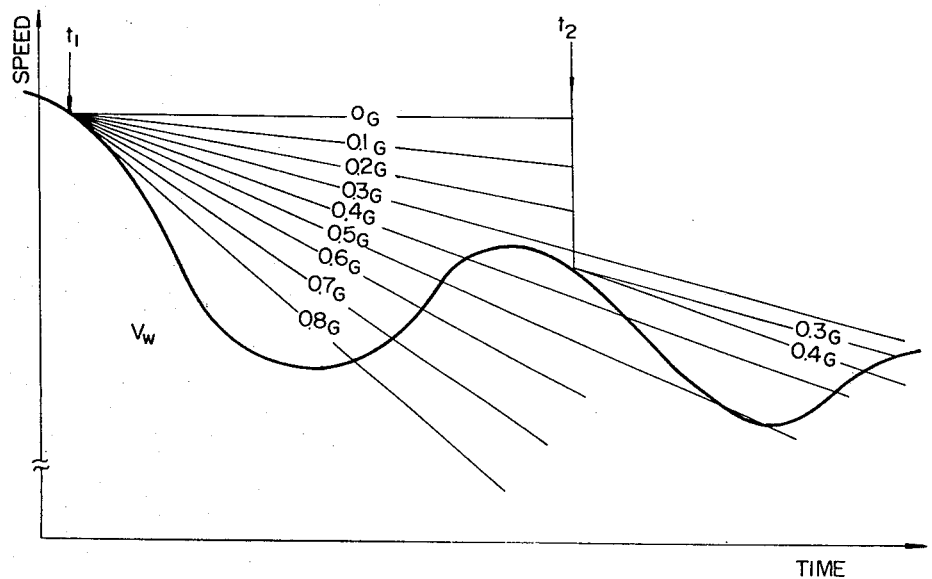
FIG. 11 is a graph showing a variation in the value of reference signals generated in the brake control system of FIG. 10.

Referring to FIGS. 10 and 11, there is schematically illustrated still another embodiment of the brake control system according to the present invention. In the shown embodiment, several different values of decelerating inclinations are preset. One of the preset decelerating inclinations is selected corresponding to wheel r.p.m. The target wheel r.p.m. determining means 708 determines the target wheel r.p.m. $V_{w0}$ based on the selected decelerating inclination.

Now, we briefly explain the construction of the shown embodiment of the brake control system with functions thereof. The reference numeral 700 denotes a wheel r.p.m. determining means for determining wheel r.p.m. $V_w$. The wheel r.p.m. determining means 700 generates a signal proportional to determined wheel r.p.m. $V_w$. The signal is fed to a decelerating state detector 702. The decelerating state detector 702 differentiates the signal value to determine a deceleration rate $dVw/dt$. In the decelerating state detector, the determined deceleration rate is compared with a predetermined value $V_{set}$. When the deceleration rate equals or exceeds the predetermined value, the decelerating state detector 702 generates a signal $e_b$. The signal $e_b$ is fed to a reference signal generator 704. Responsive to the signal $e_b$, the reference signal generator generates various values 0G to 0.8G, of signals. These signals as shown in FIG. 11, respectively indicate preset values of deceleration inclination of the wheel r.p.m. The signals 0G to 0.8G are fed to a comparator 706. At the same time, the signal fed from the wheel r.p.m. determining means 700 and indicative of the determined wheel r.p.m. $V_w$ is input to the comparator 706. In the comparator, the signal $V_w$ is compared with the signals 0G to 0.8G. The comparator selects that one of the signals 0G to 0.8G which has a value which is closest to the value of signal $V_w$. Thus, the signal indicative of the decelerating inclination is determined. The determined signal is fed to a target wheel r.p.m. determining means 708. The target wheel r.p.m. determining means 708 determines the target wheel r.p.m. $V_{w0}$ based on the input signal from the comparator 706.

Here, assuming the brake is applied and the deceleration ratio $dVw/dt$ of the wheel r.p.m. becomes equal to or greater than the predetermined value $V_{set}$ at a time $t_1$, the decelerating state detector 702 generates the signal $e_b$. Responsive to the signal $e_b$, the reference signal generator 704 generates the various signals 0G to 0.8G. At this time, the comparator 706 is maintained in an inoperative condition.

By the inoperativeness of the comparator 706, the target wheel r.p.m. $V_{w0}$ for the first cycle of the skid control operation will not be given to the skid control system. However, as stated above, cycles of skid control for the the driving wheel and driven wheel are substantially different and the skid control for the driving wheel lags the driven wheel, so that no problem is caused by inoperative condition of the comparator. But, if necessary, the initial decelerating inclination setting means which is comprised similarly to the foregoing embodiments, is provided in the system.

Responsive to the second signal $e_b$ generated at the time $t_2$, the comparator 706 become operative. The comparator 706 compares the signal indicative of wheel r.p.m. $V_{w2}$ at the time $t_2$ with the signals 0G to 0.8G, previously generated responsive to the first signal $e_b$, as used to reduce the value of $V_w$ at time $t_1$ in accordance with the time difference $t_2-t_1$. As shown in FIG. 11, if the value of signal $V_w$ at time $t_2$ is intermediate between values of the signals 0.3G and 0.4G, the comparator 706 provides an output indicative of deceleration inclination corresponding to a signal value of either one of 0.3G and 0.4G. Thus, based on the determined decelerating inclination, the target wheel r.p.m. determining means 708 determines the target wheel r.p.m. $V_{w0}$.

Similarly to responding to the first signal $e_b$, the reference signal generator 704 generates signals 0G to 0.8G in response to the second signal $e_b$. These signals 0G to 0.8G are used with the next cycle of skid control operation.

Figure 12:
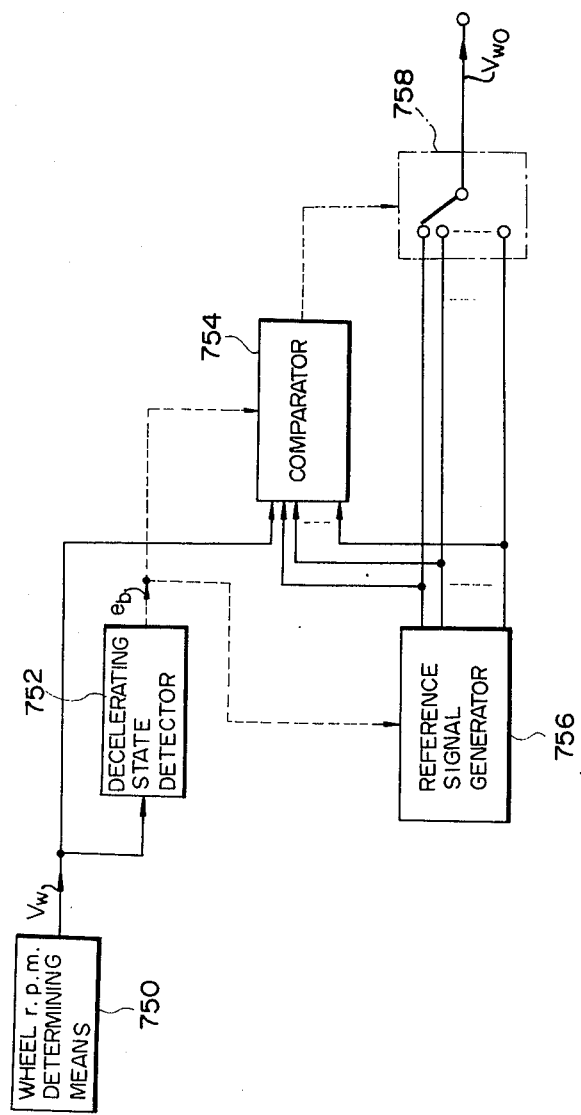
FIG. 12 is a block diagram of a further embodiment of a brake control system according to the present invention, in which the system of FIG. 10 is further modified and simplified.

In FIG. 12, there is shown a further embodiment of the brake control system as a modification of the foregoing embodiment of FIG. 10. In the shown embodiment, the wheel r.p.m. $V_w$ determined by a wheel r.p.m. determining means 750 is fed to a decelerating state detector 752 and a comparator 754. When the deceleration ratio $dVw/dt$ becomes equal to or less than the predetermined value $V_{set}$, the decelerating state detector 752 generates a signal $e_b$. With substantially short delay, the reference signal generator 756 generates various values of signals which indicate a target wheel r.p.m. $V_{w0}$. The signals generated by the reference signal generator 756 are fed to the comparator 754 to be compared with the signal $V_w$. The comparator selects one of the signals of the reference signal generator 756 and generates a signal. The signal is fed to a switching circuit 758. Responsive to the signal, the switching circuit connects one of the output terminals of the reference signal generator 756 to an output terminal. Thus, the signal indicative of desired target wheel r.p.m. $V_{w0}$ can be output to the skid control means of the driving wheel.

By this embodiment, constructed as above, the structure and operation of the system can be further simplified.

As described above, the brake control system according to the present invention varies the target wheel r.p.m. corresponding to variation of the coefficient of friction between the wheel tread and the road surface during a skid control operation as determined by detection of the deceleration rate of wheel r.p.m. Accordingly, even when the friction is remarkably varied during braking condition, the wheel r.p.m. is decelerated at the most effective rate to satisfactorily and effectively decelerate the vehicle.

Preferably, it is the variation in the deceleration rate of the driven wheels which is utilized for skid controlling the driving wheel, since the skid cycle of the driven wheel is considerably earlier than that of the driving wheel. Thus, use of driven wheel data aids in providing increased accuracy of detection of the peak of the friction coefficient.

What is claimed is:
1. A brake control system for an automotive vehicle for controlling application and release of brake pressure to a wheel cylinder to prevent the vehicle from skidding, comprising:
  first means for determining wheel r.p.m. and generating a first signal indicative of determined wheel r.p.m.;
  second means for determining a deceleration rate of wheel r.p.m. based on said first signal and generating a second signal when the determined deceleration rate becomes equal to or greater than a predetermined value;
  third means responsive to said second signal to hold a signal value of said first signal for each cycle of skid control operation, to determine a deceleration coefficient based on the held values of said first signals generated in a current cycle and in an immediately preceding cycle of skid control operation and further based on a time interval between said second signals, to determine a ramp signal indicative of decelerating r.p.m. in the next cycle of skid control operation based on the determined deceleration coefficient and to determine a target wheel r.p.m. signal having a value indicative of a target wheel r.p.m. calculated by subtracting the value of said ramp signal from the value of said first signal, said third means producing a third signal when said current first signal value becomes equal to or less than said target wheel r.p.m. signal; and fourth means for controlling application and release of brake pressure to the wheel cylinder depending on absence or presence of said third signal.

2. A brake control system as set forth in claim 1, further comprising a fifth means responsive to releasing of the brake pressure to produce a fifth signal, wherein said third means comprises a first circuit means for receiving said first signal and holding a signal value thereof in response to a clock signal;

a second circuit means for receiving said fifth signal from said fifth means and generating said clock signal responsive to said fifth signal to make said first circuit means operative to hold said signal value;

a third circuit means for measuring an interval between said fifth signals;

a fourth circuit means for determining a difference between values of the current and immediately preceding first signals held in said first circuit means and for obtaining said deceleration coefficient based on the determined difference and the interval measured by said third circuit means;

a fifth circuit means for determining a value of said ramp signal based on said determined deceleration coefficient; and a sixth circuit means for determining the target wheel r.p.m. by subtracting the value of said ramp signal determined by said fifth circuit means from the current value of said first signal held in said first circuit means.

3. A brake control system as set forth in claim 2, wherein said third means further comprises:

a seventh circuit means for presetting an initial deceleration coefficient of wheel r.p.m. for the first cycle of skid control operation and generating a signal representative of said preset deceleration coefficient; and an eighth circuit means for selectively inputting signals generated in said fourth circuit means and in said seventh circuit means to said fifth circuit means, said eighth circuit means being operative to input signals of said seventh circuit means in response to the first produced fifth signal and being operative to switch the input signal from the seventh circuit means to said fourth circuit means responsive to the following fifth signal.

4. A brake control system as set forth in claim 2 or 3, wherein said first circuit means comprises a pair of sample-hold circuit means operating alternately for sampling and holding said first signal, one of which provides an output corresponding to a held first signal representative of wheel r.p.m. in the immediately preceding cycle of skid control operation and the other provides an output corresponding to the current first signal, a switching circuit means for selectively inputting said current first signal to one of said sample-hold circuit means and a divider means receiving outputs from said sample-hold circuit means, for subtracting said output value corresponding to the held first signal from the output value corresponding to the current first signal value and dividing the resulting difference between the outputs by the value of the interval between said fifth signals measured by said third circuit means.

5. A brake control system as set forth in claim 4, wherein said switching circuit means is operative to switch operation of said sample-hold circuits in response to said clock signal fed from said second circuit.

6. A method for controlling a brake system of an automotive vehicle comprising the steps of:

determining wheel r.p.m. and generating a first signal indicative of the determined wheel r.p.m.;

determining a deceleration rate of the wheel based on the determined wheel r.p.m.;

comparing the determined deceleration rate with a predetermined reference value and generating a second signal when the determined deceleration rate becomes equal to or greater than the predetermined reference value;

calculating a deceleration coefficient based on said first signal value;

calculating a decelerating wheel r.p.m. based on said deceleration coefficient and said first signal value; and subtracting said deceleration coefficient from the value of said first signal at the time said second signal is produced to obtain said decelerating wheel r.p.m.

7. A method as set forth in claim 6, wherein said method further comprises:

presetting an initial deceleration coefficient; and determining the value of said decelerating wheel r.p.m. based on the preset value of deceleration coefficient in the first cycle of skid control operation.

8. A method as set forth in claim 7, wherein the step of determining value of said decelerating wheel r.p.m. based on the preset value of deceleration coefficient is carried out responsively to a first clock signal generated in response to detecting the first occurrence of said second signal and ceases in response to a second clock signal generated in response to a second occurrence of said second signal.

9. An anti-skid brake control system for an automotive vehicle for controlling application and release of brake pressure to a wheel cylinder in a hydraulic automotive brake circuit, comprising:

first means for detecting wheel r.p.m. and producing a first signal having a value proportional to the wheel r.p.m.;

second means for calculating a deceleration rate of the wheel r.p.m. based on variation of said first signal value and producing a second signal when said deceleration rate becomes equal to or greater than a first threshold;

third means for calculating a deceleration coefficient based on variation of said first signal value during an interval between occurrences of said second signals and on the length of said interval and for calculating a target wheel r.p.m. based on said deceleration coefficient and on a value of said first signal value at the time of occurrence of said second signal, said third means producing a third signal representative of said target wheel r.p.m. and comparing said third signal value with said first signal to produce a control signal when said first signal value becomes equal to or less than said third signal value; and fourth means, responsive to said control signal, for releasing said brake pressure.

10. The system as set forth in claim 9, wherein said third means includes a first circuit means for measuring the length of said interval and producing a time signal representative of the measured period of said interval, second circuit means for determining the variation of said first signal value in said interval, and third circuit means for calculating said deceleration coefficient from said length of said interval and said variation of said first signal value in said interval.

11. The system as set forth in claim 9 or 10, wherein said third means further includes memory circuit means for storing an initial deceleration coefficient for a first cycle of anti-skid control and switching means for switching the deceleration coefficient used in calculating said target wheel r.p.m. between the initial coefficient stored in said memory circuit means and that calculated in said third means.

12. The system as set forth in claim 10, wherein said second circuit means includes a pair of sample/hold circuit means alternately operable in a sampling mode and holding mode, one of which is responsive to said second signal to hold the first signal value and the other being turned to said sampling mode as said one of said sample/hold circuit means is turned to the holding mode.

13. The system as set forth in claim 9, wherein said third means for calculating said deceleration coefficient includes a memory circuit storing a plurality of deceleration coefficients one of which is selected depending on the first signal value.

14. The system as set forth in claim 9 wherein said third means comprises:

arithmetic circuit means receiving said first and second signals for providing a fourth signal representing a difference between said first signal values on occurrences of said second signal and a fifth signal representing a length of time between said occurrence of said second signal, dividing means for dividing said fourth signal by said fifth signal to obtain said deceleration coefficient and to provide a sixth signal representative thereof, means for determining an initial value of said deceleration coefficient and providing a seventh signal representative thereof, storage means receiving said first signal and responsive to said second means for storing the value of said first signal, preset counter means receiving the stored value from said storage means for presetting a number therein and further receiving a count signal, said preset counter means outputting an eighth signal when its preset number has been counted by said count signal, count signal generating means receiving an input signal for generating a count signal representing the input signal, said count signal being provided to said preset counter means, and switching means responsive to said second means for selectively providing said sixth or said seventh signal to said count signal generating means.

15. A brake control system for controlling application and release of brake pressure to a wheel of an automotive vehicle to prevent the vehicle from skidding, comprising:

wheel speed sensing means for determining wheel speed for a braked wheel and producing a first signal representative thereof;

deceleration detecting means receiving said first signal for determining a condition wherein said wheel speed is decelerating at a rate equaling or exceeding a threshold and producing a second signal indicative thereof;

target wheel speed determining means receiving and responsive to said first and second signals for generating a third signal representing a target wheel speed as a function of a deceleration rate averaged between occurrences of said second signal, including:

sample and hold means sampling said first signal and, responsively to said second signal, for holding values of said first signal having a predetermined time relationship with said second signal;

deceleration rate determining means for obtaining a difference between the held values of said first signal and dividing the difference thus obtained by the length of a time interval between the occurrences of said second signal to obtain an averaged deceleration rate for said wheel speed during said time interval and providing a fourth output signal indicative thereof;

integrating means connected for receiving said output signal indicative of said averaged deceleration rate for producing a fifth output signal indicative of an integral of said averaged deceleration rate;

subtracting means for obtaining a difference between said first signal and said fifth signal to produce a sixth signal representing a target wheel speed for comparison with wheel speed during a next cycle of operation of the system, and control means responsive to said sixth signal and to said first signal for releasing brake pressure to said wheel when the wheel speed represented by said first signal drops below the target speed therefor represented by said sixth signal.

16. A brake control system as recited in claim 15, wherein said deceleration detecting means is operative to produce said second signal at a deceleration indicative of a predetermined slip rate.

17. A brake control system for controlling application and release of brake pressure to a wheel of an automotive vehicle to prevent the vehicl from skidding, comprising:

wheel speed sensing means for determining wheel speed for a braked wheel and producing a first signal representative thereof;

deceleration detection means receiving said first signal for determining a condition wherein said wheel speed is decelerating at a rate equalling or exceeding a threshold and producing a second signal indicative thereof;

target wheel speed determining means receiving and responsive to said first and second signals for generating a third signal representing a target wheel speed, including reference signal generating means responsive to said deceleration detecting means for generating a plurality of signals representing a plurality of decelerating rates, decelerating rate determining means receiving said first and second signals and said plurality of signals for selecting one of said decelerating rates by comparing a value of said first signal obtained at one occurrence of said second signal with a value obtained by subtracting said plurality of decelerating rates from a value of said first signal obtained at a previous occurrence of said second signal, and means responsive to said selected decelerating rate for providing a target wheel speed for said first signal upon a subsequent occurrence of said second signal.

18. A brake control system as recited in claim 17 wherein said means responsive to said selected decelerating rate comprises means for subtracting said selected decelerating rate from said value of said first signal obtained at said one occurrence of said second signal.

19. A brake control system as recited in claim 17 wherein said reference signal generating means includes means for subtracting said decelerating rate from said value of said first signal obtained at said previous occurrence of said second signal and for providing the results of said subtraction in said plurality of signals representing a plurality of target wheel speeds.

20. A brake control system as recited in claim 19 wherein said means responsive to said selected decelerating rate comprises switching means having a plurality of input terminals and an output terminal, said switching means receiving said plurality of signals output by said reference signal generating means on said input terminals thereof and responsive to said decelerating rate determining means for switching the signal representing the selected decelerating rate to said output terminal thereof.

* * * * *